United States Patent [19]

Singleton

[11] Patent Number: 4,922,619

[45] Date of Patent: May 8, 1990

[54] UNIVERSAL SUNDIAL

[76] Inventor: John S. Singleton, The Old Coach House, Salcombe Road, Newbury, Berks RG14 6EB, United Kingdom

[21] Appl. No.: 269,133

[22] Filed: Nov. 9, 1988

[30] Foreign Application Priority Data

Nov. 19, 1987 [GB] United Kingdom ................. 8727154

[51] Int. Cl.5 ................................................ G01C 1/00

[52] U.S. Cl. ...................................................... 33/270

[58] Field of Search .................. 33/270, 271, 268, 269

[56] References Cited

U.S. PATENT DOCUMENTS 4,237,611 12/1980 Wurch ............................ 33/271 X

*Primary Examiner*—Harry N. Haroian

*Attorney, Agent, or Firm*—Barnes, Kisselle, Raisch, Choate, Whittemore & Hulbert

[57] ABSTRACT

A sundial has a scale 3 on the inner face of a single-turn helix 1, and a gnomon 2 which is a rod or wire lying along its axis. The scale is linear and the instrument can be used at substantially any location, regardless of latitude or longitude. It can be advanced for statutory Summer Time, and adjusted to compensate for non-linearity in the sun's apparent movement ('Equation of Time').

11 Claims, 1 Drawing Sheet

UNIVERSAL SUNDIAL

BACKGROUND OF THE INVENTION

1. Field of the Invention

This invention relates to a universal sundial.

2. Description of the Prior Art

It is well known that a sundial can be formed by a gnomon lying parallel to the earth's north-south axis and throwing an indicating shadow upon a surface which is marked with lines representing the hours. The scale surfaces used in known sundials give rise to one or more of the following disadvantages: non-linear scale, calibration specific to geographic location, limited range of hours covered, restricted times of year covered.

SUMMARY OF THE INVENTION

According to the present invention there is provided a sundial whose scale is inscribed on the inner surface of a cylinder, which is coaxial with a gnomon rod or wire. In practice, however, the cylinder must be partially relieved or cut away to allow the sunlight through. Accordingly the cylinder is reduced to the form of substantially one turn of a helix.

The invention overcomes all the said disadvantages of prior sundials, and has other advantages. Its adjustment to statutory local clock-time at any location may be carried out by a rotational movement of the scale, or scale and gnomon together, about the axis. Likewise the change from, say, Greenwich Mean Time to British Summer Time can be accomplished. Also small corrections may optionally be made during the year to compensate for the 'Equation of Time'.

BRIEF DESCRIPTION OF THE DRAWINGS

A specific embodiment of the invention will now be described by way of example with reference to the accompanying drawing in which.

DESCRIPTION OF THE PREFERRED EMBODIMENT

Figure 1:
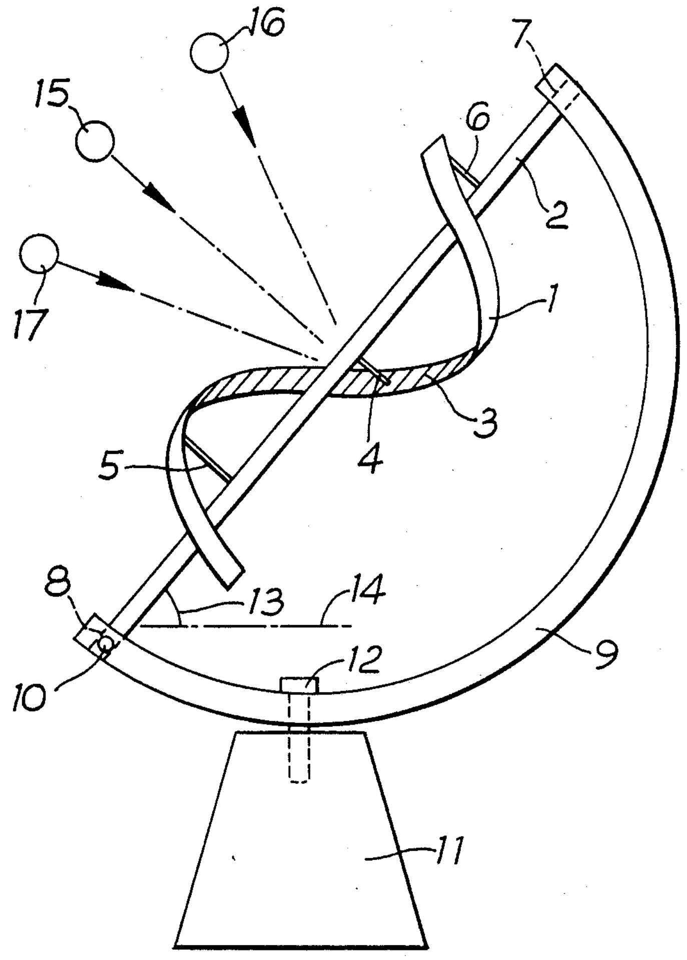
FIG. 1 shows in perspective, the sundial.

Referring to the drawing, the sundial comprises a helix 1 and a gnomon rod 2 situated along its axis. A scale 3 is inscribed on the inner face of the helix. The helix extends to one turn (or a little more), so that the scale may cover twenty-four hours (midnight to noon to midnight). The hour marks of the scale are uniformly spaced, and are parallel to the gnomon and to its shadow. The marks are accompanied by numbers (not shown). The gnomon's diameter is conveniently chosen such that its shadow spans a quarter of an hour on the scale. The scale is attached to the gnomon by three thin radial spokes 4, 5 and 6 which are connected at the scale marks for twelve noon, four a.m. and eight p.m. respectively. The ends of the gnomon are mounted in sockets 7, 8 carried by a frame 9, so that the gnomon can occasionally be rotated about its axis to set up or adjust the indicated time, and then clamped by a screw 10. The frame is attached to a base 11 by a vertical pivot/clamp bolt 12 which passes through a longitudinal slot in the frame. Thus the frame may be tilted and rotated so that the gnomon is inclined at an angle 13 equal to the local angle of latitude, while its projection 14 on the horizontal plane lies in the north-south direction.

Several representative positions for the sun are shown at 15 (the equinoxes) and 16,17 (the solstices). Due to suitable dimensioning, the sun is always able to generate a shadow of the gnomon on the scale, unobscured by shadows thrown by the helix. (In polar regions where the frame would cause an obscuring shadow at around midnight, the gnomon may be supported at the lower end only.)

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A sundial comprising a relieved cylinder in the form of at least a partial turn of a helix, a gnomon, and means for supporting said relieved cylinder and said gnomon such that the gnomon is disposed axially of the relieved cylinder.

2. A sundial as claimed in claim 1 and further comprising a scale of hour numbers disposed on the inner surface of the helix.

3. A sundial as claimed in claim 2, wherein the gnomon is a rod and the diameters of the gnomon and the helix are such that the shadow, in use, cast by the gnomon has a width corresponding to a specific fraction of an hour.

4. A sundial as claimed in claim 1, wherein said support means comprise a plurality of support arms which extend radially of the relieved cylinder.

5. A sundial comprising a base, a support member mounted on the base for movement relative to the base, a gnomon mounted on the support member, and a relieved cylinder in the form of at least a partial turn of a helix, the relieved cylinder being fixedly mounted on the gnomon so that the gnomon extends axially of the relieved cylinder.

6. A sundial according to claim 5, wherein the gnomon is rotationally mounted in the support member, whereby it may be rotated about its axis in order to effect a time correction.

7. A sundial according to claim 5, wherein the gnomon is supported at its end in the support member, and wherein means are provided for releasably securing the gnomon in a selected rotational position relative to the support member.

8. A sundial according to claim 5, wherein the support member is adjustably mounted on the base both for rotational movement about a vertical axis and for tilting movement in a vertical plane.

9. A sundial according to claim 5, wherein the helix is provided with a scale and hour numbers on its inner surface.

10. A sundial according to claim 9, wherein the diameters of the gnomon and the relieved cylinder are such that the shadow, in use, cast by the gnomon has a width corresponding to a specific fraction of an hour.

11. A sundial according to claim 5, wherein the relieved cylinder is mounted on the gnomon by a plurality of support arms which extend radially of the relieved cylinder.

* * * * *